United States Patent
Kobayashi et al.

(10) Patent No.: US 9,422,977 B2
(45) Date of Patent: Aug. 23, 2016

(54) BEARING MECHANISM

(71) Applicant: NAMIKI SEIMITSU HOUSEKI KABUSHIKI KAISHA, Tokyo (JP)

(72) Inventors: Yasuyuki Kobayashi, Kuroishi (JP); Misako Tsugawa, Kuroishi (JP)

(73) Assignee: NAMIKI SEIMITSU HOUSEKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/316,236

(22) Filed: Jun. 26, 2014

(65) Prior Publication Data
US 2015/0003764 A1    Jan. 1, 2015

(30) Foreign Application Priority Data
Jun. 28, 2013  (JP) ................................. 2013-135944

(51) Int. Cl.
F16C 25/08  (2006.01)
F16C 19/08  (2006.01)

(52) U.S. Cl.
CPC ............... *F16C 25/083* (2013.01); *F16C 19/08* (2013.01)

(58) Field of Classification Search
CPC ........ F16C 23/08; F16C 25/08; F16C 25/083; F16C 19/08
See application file for complete search history.

(56) References Cited

U.S. PATENT DOCUMENTS

| | | | | |
|---|---|---|---|---|
| 1,399,959 A | * | 12/1921 | Hanson | ........................ 384/517 |
| 2,314,622 A | * | 3/1943 | Klamp | ........................ 384/563 |
| 3,351,398 A | * | 11/1967 | Park et al. | ..................... 384/456 |
| 3,738,719 A | * | 6/1973 | Langner | ........................ 384/517 |
| 3,816,013 A | * | 6/1974 | Schuhmann | ................... 403/368 |
| 3,940,192 A | * | 2/1976 | Hagele | ........................ 384/517 |
| 4,676,667 A | * | 6/1987 | Komatsu et al. | ................ 384/99 |
| RE34,310 E | * | 7/1993 | Duncan | ........................ 384/517 |
| 5,624,193 A | * | 4/1997 | Vogelsberger et al. | ....... 384/517 |
| 5,810,483 A | * | 9/1998 | Vites | ............................ 384/517 |
| 6,461,051 B1 | * | 10/2002 | Rode | ............................ 384/551 |
| 8,136,997 B2 | * | 3/2012 | Rivett et al. | ................... 384/551 |

(Continued)

FOREIGN PATENT DOCUMENTS

CN   1478183 A   2/2004
CN   1644963 A   7/2005

(Continued)

OTHER PUBLICATIONS

The First Office Action issued by the Chinese Patent Office on Mar. 4, 2016, which corresponds to Chinese Patent Application No. 201410294491.5 and is related to U.S. Appl. No. 14/316,236.

*Primary Examiner* — Alan B Waits
(74) *Attorney, Agent, or Firm* — Studebaker & Brackett PC

(57) ABSTRACT

A bearing mechanism includes: an outer ring; an inner ring rotatably supported by a plurality of rolling elements on an inner peripheral side of the outer ring; a rotating shaft supported by the inner ring on an inner peripheral side of the inner ring; a supporting member supporting one of the outer and inner rings, the supporting member being configured to prevent the one ring from moving in an axial direction; and a centrifugal spring on an outer peripheral portion of the rotating shaft, the centrifugal spring being configured to generate preload between the outer and inner rings by applying pressure to the other ring of the outer and inner rings in the axial direction. The centrifugal spring is configured to elastically expand a diameter thereof and elastically contract in an axial direction thereof by a centrifugal force caused by integral rotation with the rotating shaft.

19 Claims, 17 Drawing Sheets

(56) References Cited

U.S. PATENT DOCUMENTS

| | | | |
|---|---|---|---|
| 8,251,460 B2 * | 8/2012 | Veux | 301/110.5 |
| 8,303,187 B2 * | 11/2012 | Udall et al. | 384/517 |
| 8,348,513 B2 * | 1/2013 | Rusteberg et al. | 384/517 |
| 8,602,656 B2 * | 12/2013 | Mashino et al. | 384/517 |
| 8,845,202 B2 * | 9/2014 | Teimel | 384/517 |
| 2004/0023750 A1 | 2/2004 | Schulz et al. | |
| 2004/0101219 A1 | 5/2004 | Coates | |
| 2005/0157966 A1 | 7/2005 | Tsukada et al. | |
| 2014/0321780 A1 * | 10/2014 | Bussit et al. | 384/125 |
| 2015/0003764 A1 * | 1/2015 | Kobayashi et al. | 384/447 |
| 2015/0075899 A1 * | 3/2015 | Kikuchi et al. | 180/444 |

FOREIGN PATENT DOCUMENTS

| | | | |
|---|---|---|---|
| CN | 1717551 A | | 1/2006 |
| DE | 3522600 A1 | * | 1/1987 |
| DE | 9207650 U1 | * | 9/1992 |
| DE | 19607336 A1 | * | 8/1997 |
| GB | 279789 A | * | 12/1927 |
| JP | 05-196034 A | | 8/1993 |
| JP | H11-239902 A | | 9/1999 |

* cited by examiner

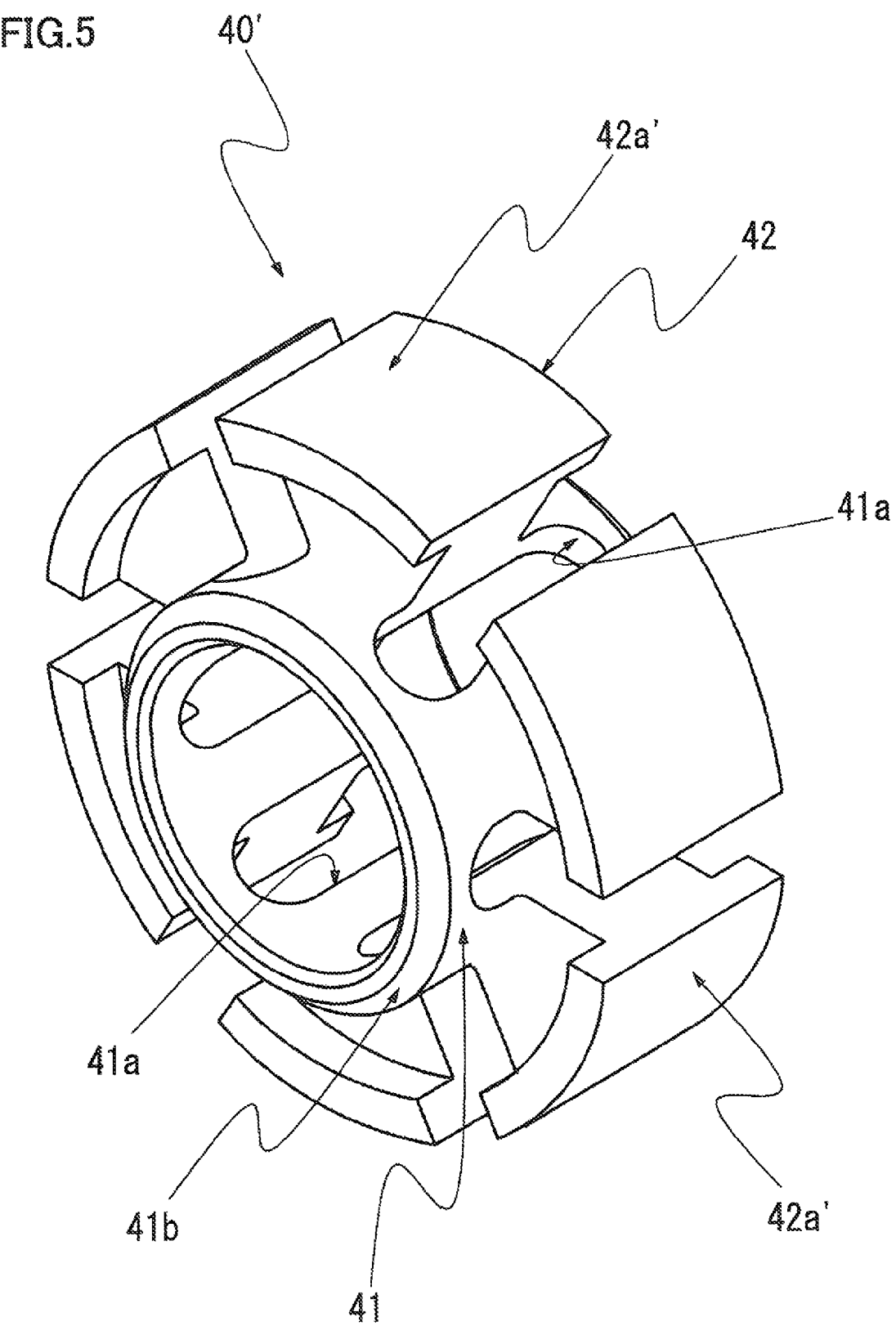

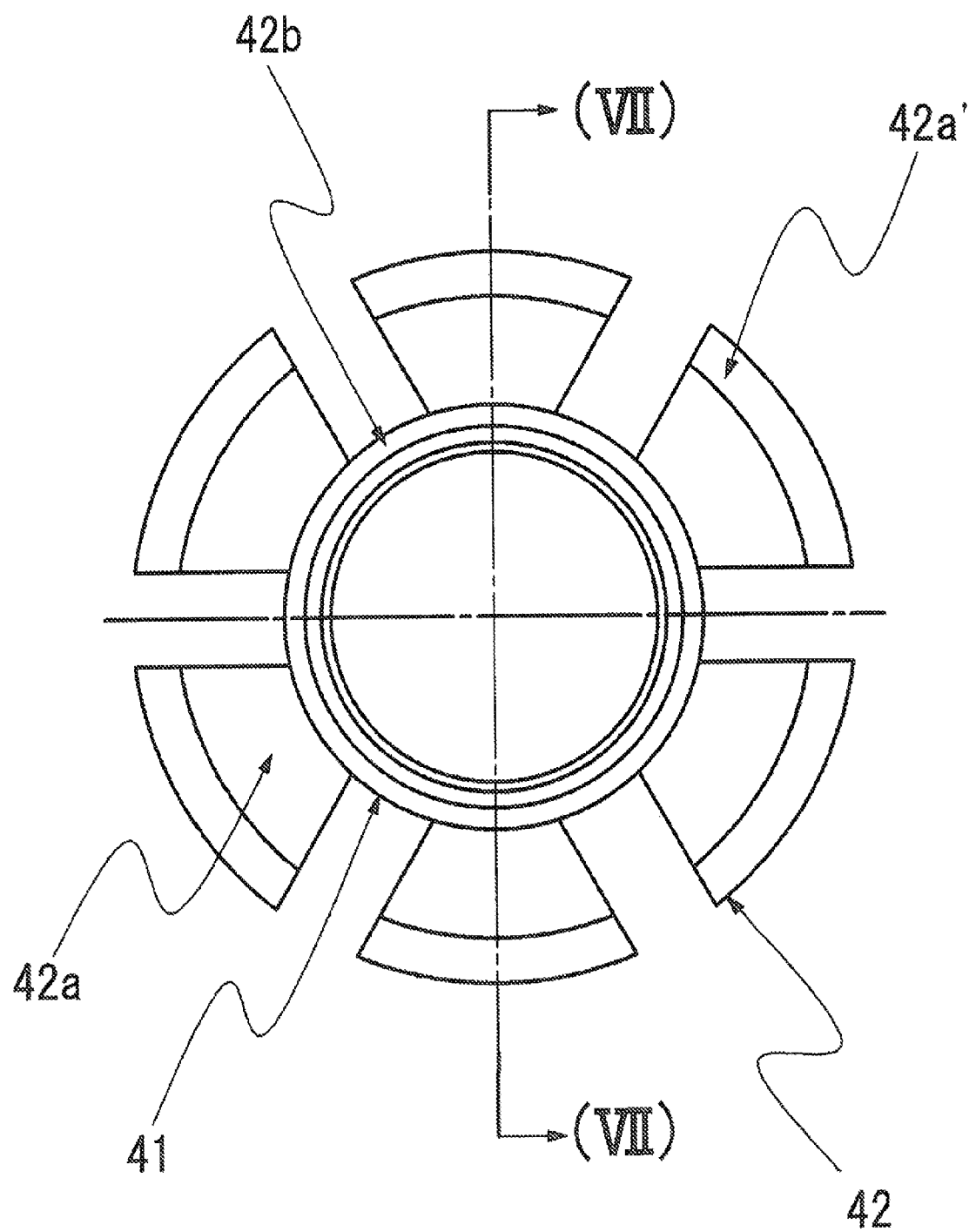

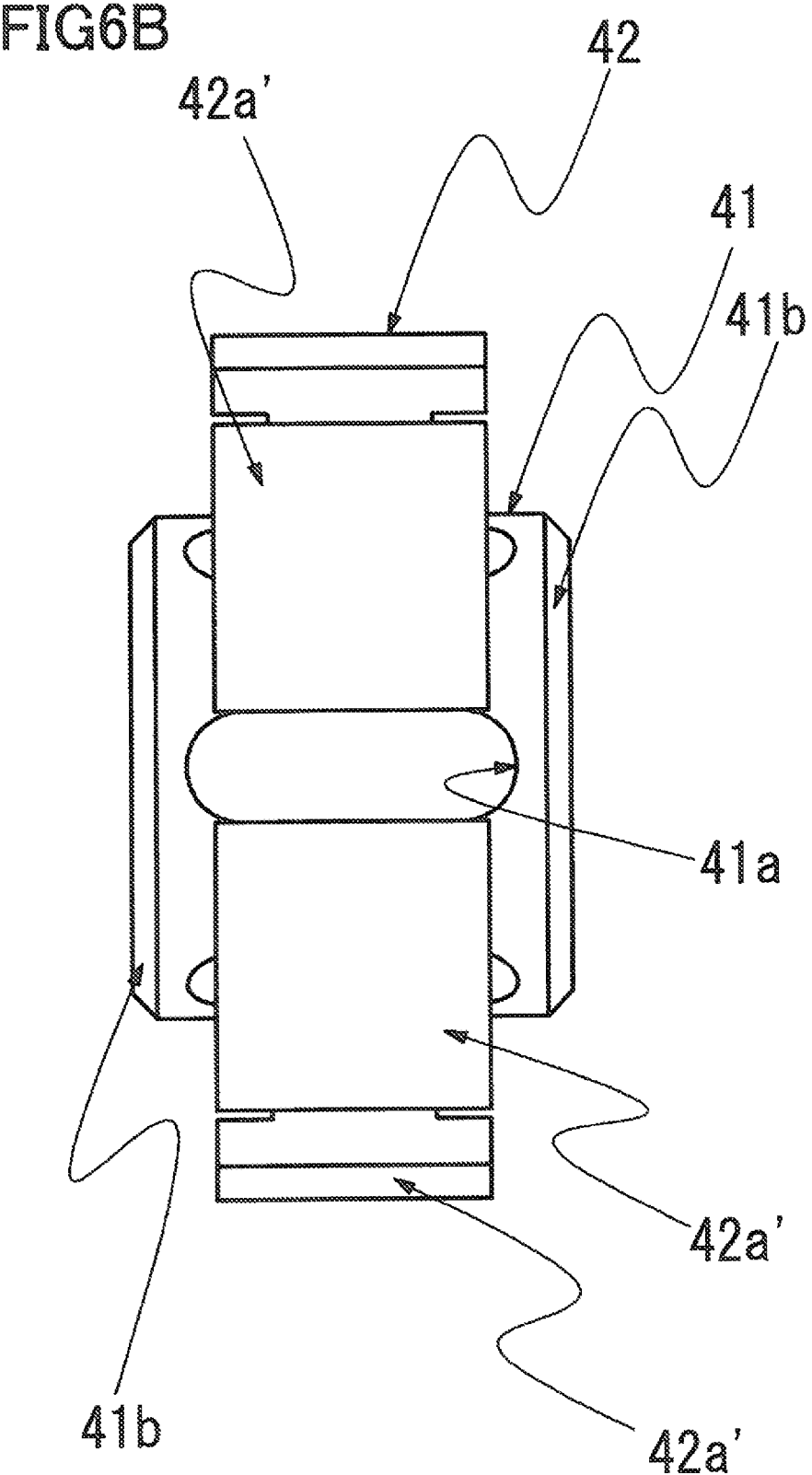

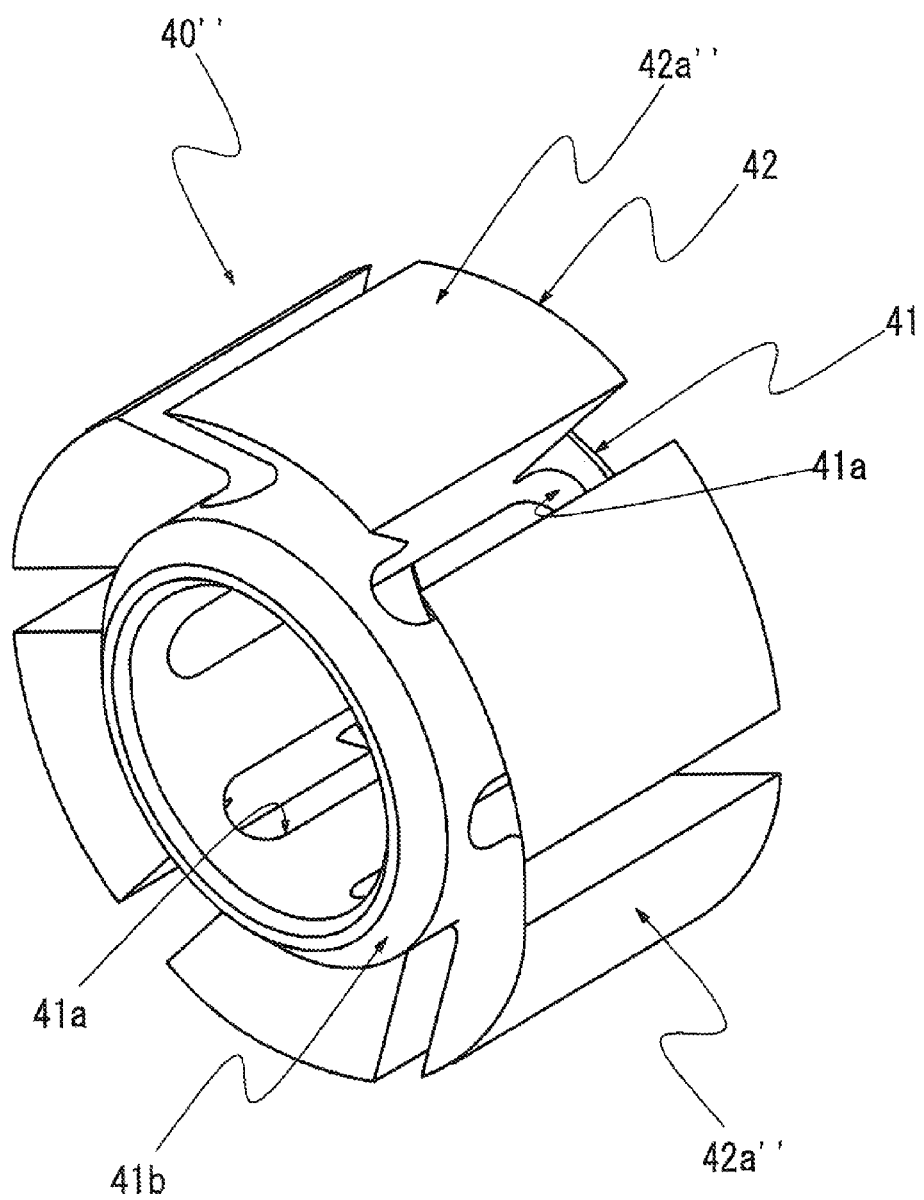

BEARING MECHANISM

CROSS-REFERENCE TO RELATED APPLICATION

This application claims priority from Japanese Patent Application No. 2013-135944 filed with the Japan Patent Office on Jun. 28, 2013, the entire content of which is hereby incorporated by reference.

BACKGROUND

1. Technical Field

The present disclosure relates to a bearing mechanism suitable as a structure of a bearing, such as a mechanical tool bearing, being subjected to high load at low rotational speeds and low load at high rotational speeds.

2. Related Art

Generally, in the case of using a ball bearing as a bearing for a high-speed rotating shaft, the accuracy of rotation can be improved by increasing the stiffness of the rotating shaft in the radial and axial directions. Hence, the ball bearing is preloaded. In the preloading, one of the inner and outer rings of the ball bearing is fixed, and pressure is axially applied to the other. Pressure is therefore applied (held) beforehand to between the inner and outer rings. Methods for applying preload include, for example, the fixed position preload method and the constant pressure preload method. In the fixed position preload method, as illustrated in FIG. 13, in terms of adjacent bearings 110 and 110, outer rings 111 and 111 are brought into contact with each other, and a space s is defined between inner rings 112 and 112. In this state, pressure is applied to these inner rings 112 and 112 from both sides in the axial direction. In the constant pressure preload method, as illustrated in FIG. 14, a spring 213 is provided between outer rings 211 and 211 of adjacent bearings 210 and 210. The outer rings 211 and 211 are biased by the spring 213.

SUMMARY

A bearing mechanism according to an aspect of the present disclosure includes: an outer ring; an inner ring rotatably supported by a plurality of rolling elements on an inner peripheral side of the outer ring; a rotating shaft supported by the inner ring on an inner peripheral side of the inner ring; a supporting member supporting one of the outer and inner rings, the supporting member being configured to prevent the one ring from moving in an axial direction; and a centrifugal spring on an outer peripheral portion of the rotating shaft, the centrifugal spring being configured to generate preload between the outer and inner rings by applying pressure to the other ring of the outer and inner rings in the axial direction. The centrifugal spring is configured to elastically expand a diameter thereof and elastically contract in an axial direction thereof by a centrifugal force caused by integral rotation with the rotating shaft.

BRIEF DESCRIPTION OF DRAWINGS

FIG. 5 is a perspective view of another example of a centrifugal spring;

FIG. 6A is a front view of the centrifugal spring illustrated in FIG. 5, and FIG. 6B is a side view of the centrifugal spring;

FIG. 8 is a perspective view of still another example of a centrifugal spring;

DETAILED DESCRIPTION

Figure 1:
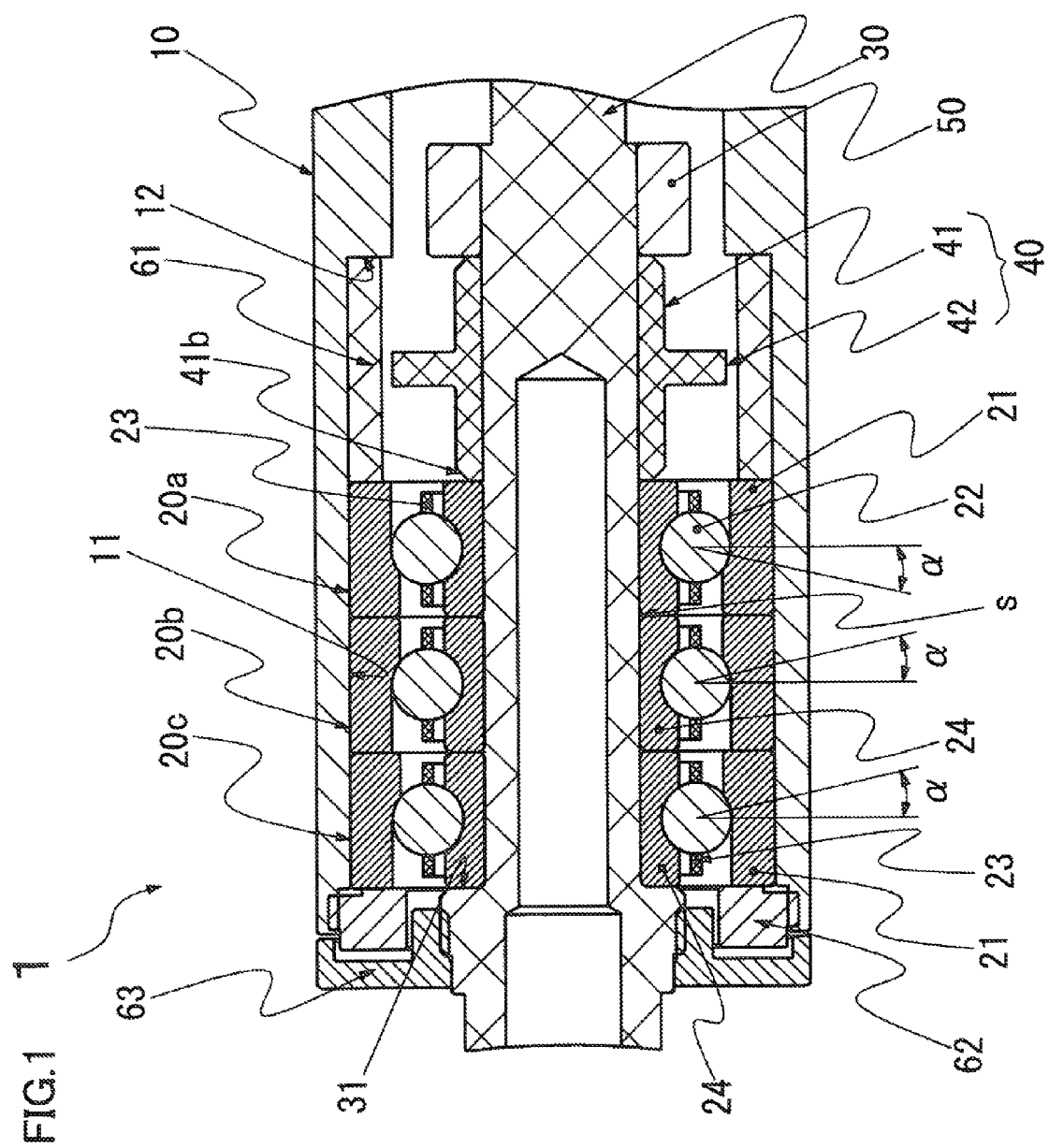
FIG. 1 is a cross-sectional view of an example of a bearing mechanism according to one embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In general machining processes such as milling, there are tendencies that heavy-load processing with deep cuts is performed at low rotational speeds while light-load processing with shallow cuts is performed at high rotational speeds. In the case of the heavy-load processing, there is a need of increasing the stiffness between the inner and outer rings of the bearing. Specifically, as described above, the preload is applied to between the inner and outer rings to prevent the rotating shaft from being affected by the heavy-load and causing an adversely effect on its processing precision. Thus, the stiffness between the inner and outer rings of the bearing can be increased. Moreover, in the light-load processing, high stiffness between the inner and outer rings of the bearing is unnecessary. In this respect, and from the viewpoints of avoiding the reduction of the bearing life, and the like, the preload is preferred to be reduced appropriately.

Hence, for example, in a technology described in JP-A-05-196034, the magnitude of the preload to be applied is changed by hydraulic pressure between the heavy-load processing and the light-load processing.

However, the conventional technique uses a hydraulic pipe, an apparatus that generates and controls hydraulic pressure, and the like. The costs of the system can be therefore increased.

Moreover, in a technology described in JP-A-11-239902 as another conventional technique, a disc spring (11) is provided on one side of a bearing (2) in the axial direction. Furthermore, on the other side are two spacers (4 and 5) and a piece (6) between the spacers (4 and 5). The disc spring (11) applies preload to an inner ring (2a) of the bearing (2) at the low rotational speeds. Moreover, the piece (6) is wedged between the two spacers (4 and 5) by the centrifugal force at high rotational speeds. Therefore, these spacers (4 and 5) axially move and press the inner ring (2a) while countering the biasing force of the disc spring (11). Therefore, the preload between the inner and outer rings is reduced.

However, in the conventional technique, the piece (6) is wedged between the two spacers (4 and 5) by the centrifugal force at high rotational speeds. Hence, the piece (6) may be difficult to move away from between the spacers 4 and 5 at low rotational speeds. In this case, the original low-preload state may not be recovered. Moreover, the conventional technique has a complicated structure where the movable disc spring (11), piece (6), spacers (4 and 5), and the like are arranged on both sides of the bearing (2). Hence, a simpler structure is desired.

One object of the present disclosure is to provide a bearing mechanism with a simple structure, capability of automatically adjusting the preload to be applied to a bearing to an appropriate level in response to the rotational speed of a rotating shaft, and excellent operating performance.

A bearing mechanism according to a first aspect of the present disclosure includes: an outer ring; an inner ring rotatably supported by a plurality of rolling elements on an inner peripheral side of the outer ring; a rotating shaft supported by the inner ring on an inner peripheral side of the inner ring; a supporting member supporting one of the outer and inner rings, the supporting member being configured to prevent the one ring from moving in an axial direction; and a centrifugal spring on an outer peripheral portion of the rotating shaft, the centrifugal spring being configured to generate preload between the outer and inner rings by applying pressure to the other ring of the outer and inner rings in the axial direction. The centrifugal spring is configured to elastically expand a diameter thereof and elastically contract in an axial direction thereof by a centrifugal force caused by integral rotation with the rotating shaft.

Therefore, the bearing mechanism according to the first aspect of the present disclosure has a simple structure, capability of automatically adjusting the preload to be applied to a bearing to an appropriate level in response to the rotational speed of the rotating shaft, and excellent operating performance.

Specifically, in the bearing mechanism according to the first aspect of the present disclosure is capable of performing the following matters:

The centrifugal spring applies pressure to the other ring in the axial direction at low rotational speeds to generate preload between the outer and inner rings;

At high rotational speeds, the centrifugal force causes the centrifugal spring to contract elastically in the axial direction while expanding the diameter elastically to reduce both the pressure on the other ring and the preload between the outer and inner rings;

When returning to the low rotational speed, the centrifugal spring that has elastically expanded the diameter and contracted is restored to its original state, reduces the diameter, and extends toward the axial direction to increase the preload between the outer and inner rings again.

In the bearing mechanism of a second aspect of the present disclosure according to claim 1, the centrifugal spring includes a radially outer portion and a radially inner portion, and a volume of the radially outer portion is larger than a volume of the radially inner portion.

With the configuration, the centrifugal force to act on the centrifugal spring can be increased. Therefore, the centrifugal spring can effectively be expanded in the diameter and be contracted.

In the bearing mechanism of a third aspect of the present disclosure according to claim 1 or 2, wherein the centrifugal spring includes a tube portion attached to the rotating shaft in a ring form, and a protruding portion radially protruding outward from near the center of the tube portion in the axial direction, and the centrifugal force caused by the integral rotation of the centrifugal spring with the rotating shaft causes the tube portion to contract elastically in the axial direction while elastically expanding the diameter of a part of the tube portion near the center in the axial direction.

With the configuration, the centrifugal force can be increased by the protruding portion. Therefore, the tube portion can be axially contracted while expanding the diameter thereof in an effective manner.

In a fourth aspect of the bearing mechanism according to the third aspect, the protruding portion includes a plurality of divided projections arranged at intervals in a ring form in the circumferential direction.

With the configuration, it is possible to reduce tensile stress in the circumferential direction occurring on the protruding portion by the centrifugal force. Therefore, the tube portion can effectively expand the diameter thereof while being contracted.

In a fifth aspect of the bearing mechanism according to the fourth aspect, a peripheral wall of the tube portion is provided with a through-hole portion that radially penetrates the peripheral wall in such a manner as to correspond to a space between the divided projections adjacent in the circumferential direction.

With the configuration, it is possible to reduce the tensile stress in the circumferential direction occurring on the tube portion by the centrifugal force. Therefore, the tube can more effectively expand the diameter thereof while being contracted.

In a sixth aspect of the bearing mechanism according to any of the third to fifth aspects, the outer diameter side of an end surface of the tube portion is shorter than the inner diameter side in the axial direction.

With the configuration, it is possible to prevent the outer diameter side of the end surface of the tube portion from protruding in the axial direction with respect to the inner diameter side due to the inclination of the end surface of the tube portion when the centrifugal force causes the center side of the tube portion in the axial direction to radially distend outward. Therefore, the axial dimension of the entire tube portion can be effectively contracted.

A seventh aspect of the bearing mechanism according to any of the first to sixth aspects further includes a thrust pad member fixed to an outer peripheral portion of the rotating shaft, and the centrifugal spring is sandwiched between the thrust pad member and the other ring.

With the configuration, one end of the centrifugal spring is fixed by the thrust pad member in such a manner as to avoid moving in the axial direction. Hence, the other end of the centrifugal spring can stably press the other ring.

Next, a preferred example of the embodiment including the above features is described in detail based on the drawings.

As illustrated in FIG. 1, a bearing mechanism 1 being a preferred example of the embodiment includes a substantially cylindrical housing 10, a plurality of bearings 20a, 20b, and 20c, a rotating shaft 30, a centrifugal spring 40, and a thrust pad member 50. The bearings 20a, 20b, and 20c are fixed to the inside of the housing 10. The rotating shaft 30 is rotatably inserted on the center sides of the bearings 20a, 20b, and 20c. The centrifugal spring 40 is pressed against the bearing 20a in the axial direction. In other words, the centrifugal spring 40 applies pressure to the bearing 20a in the axial direction. The thrust pad member 50 receives the centrifugal spring 40 from the opposite side to the bearing 20a in the axial direction. In the bearing mechanism 1, the centrifugal spring 40 is elastically deformed by the centrifugal force caused by the rotation of the rotating shaft 30. Therefore, the preload on the bearings 20a, 20b, and 20c pressed against the centrifugal spring 40 is adjusted automatically.

The housing 10 is a substantially cylindrical metal member, and includes a cylindrical bearing holding portion 11. The bearing holding portion 11 is provided on an inner peripheral surface of the housing 10. The diameter of the bearing holding portion 11 is expanded with a step. A tubular spacer 61, which is described later, and the plurality of (three according to the illustrated example) bearings (20a, 20b, and 20c) are inserted in the bearing holding portion 11. An end of the tubular spacer 61 is in contact with a step portion 12 in the housing 10 along the insertion direction.

Moreover, a ring-shaped fixing sleeve 62 is threadedly connected to an end of the housing 10 on a side opposite to the insertion direction. The tubular spacer 61 and outer rings 21 of the plurality of bearings 20a, 20b, and 20c are sandwiched between the fixing sleeve 62 and the step portion 12. Consequently, the fixing sleeve 62 holds the tubular spacer 61 and the outer rings 21 in such a manner as to prevent them from moving in the axial direction. In other words, the fixing sleeve 62 is an example of a supporting member that supports the outer rings 21 of the bearings 20a, 20b, and 20c in such a manner as to prevent them from moving in the axial direction.

Another example other than the illustrated example may not include the tubular spacer 61. In this case, the outer rings 21 of the plurality of bearings 20a, 20b, and 20c may be held directly between the step portion 12 and the fixing sleeve 62.

Each of the bearings 20a, 20b, and 20c includes the endless ring-shaped outer ring 21, a plurality of rolling elements 22, a retainer 23, and an endless ring-shaped inner ring 24. The rolling elements 22 are rollably held in the outer ring 21. The retainer 23 maintains (holds) substantially constant intervals between the rolling elements 22 in the circumferential direction. The inner ring 24 is held in the center side of the outer ring 21 in such a manner as to be rotated by the rolling elements 22. The bearings 20a, 20b, and 20c configure angular contact ball bearings. In other words, the contact direction of the outer ring 21 and the rolling element 22 inclines with respect to the radial direction. The contact direction of the outer ring 21 and the rolling element 22 indicates a vertical direction to a tangent of the rolling element 22 to the outer ring 21. Moreover, a contact angle α illustrated in FIG. 1 is an angle that the contact direction of the outer ring 21 and the rolling element 22 forms with the radial direction.

Among the plurality of bearings 20a, 20b, and 20c, the first bearing 20a from the centrifugal spring 40 side is configured such that the contact direction is oriented toward the opposite side to the centrifugal spring 40 (the left side in FIG. 1). The second bearing 20b is configured such that the contact direction is oriented toward the centrifugal spring 40 side. Such a relationship between the bearings 20a and 20b may be called a back-to-back arrangement.

Moreover, the third bearing 20c from the centrifugal spring 40 side is configured such that the contact direction is oriented toward the centrifugal spring 40 side. The relationship between the bearings 20b and 20c may be called a tandem arrangement.

A minute space s to generate preload on the bearing 20a is defined between the inner ring 24 of the bearing 20a and the inner ring 24 of the bearing 20b.

Moreover, the rotating shaft 30 is a columnar or cylindrical extra-length body. The rotating shaft 30 is pressed into the inner rings 24 of the bearings 20a, 20b, and 20c in such a manner as to rotate integrally with the inner rings 24. In other words, the rotating shaft 30 is supported by the inner rings 24.

A ring-shaped step portion 31 is formed on an outer peripheral portion of the rotating shaft 30. The step portion 31 is formed by reducing the diameter of a part (a part on the bearings 20a, 20b, and 20c side) of the rotating shaft 30. The step portion 31 is in contact with an end surface of the inner ring 24 of the bearing 20c.

A ring-shaped lid member 63 illustrated in FIG. 1 prevents or suppresses foreign substances and the like from entering the bearing side from a space between the fixing sleeve 62 and the rotating shaft 30. The lid member 63 is fixed to the outer peripheral surface of the rotating shaft 30 in such a manner as to cover the space between the fixing sleeve 62 and the rotating shaft 30.

Moreover, the centrifugal spring 40 is formed of a hard synthetic resin material that can deform elastically. The centrifugal spring 40 includes a tube portion 41 attached to the rotating shaft 30 in a ring form, and a protruding portion 42. The tube portion 41 and the protruding portion 42 are integrally formed. The protruding portion 42 radially protrudes outward from near the center of the tube portion 41 in the axial direction. The centrifugal spring 40 rotates integrally with the rotating shaft 30. The centrifugal force by the rotation causes the tube portion 41 to contract elastically in the axial direction while elastically expanding the diameter of a part near the center of the tube portion 41 in the axial direction.

The tube portion 41 is a tubular member that is attached in a ring form to and gently pressed in along the rotating shaft 30. Both ends of the tube portion 41 in the axial direction are sandwiched between the inner ring 24 of the bearing 20a and the thrust pad member 50 and accordingly the tube portion 41 rotates integrally with the rotating shaft 30.

Figure 2:
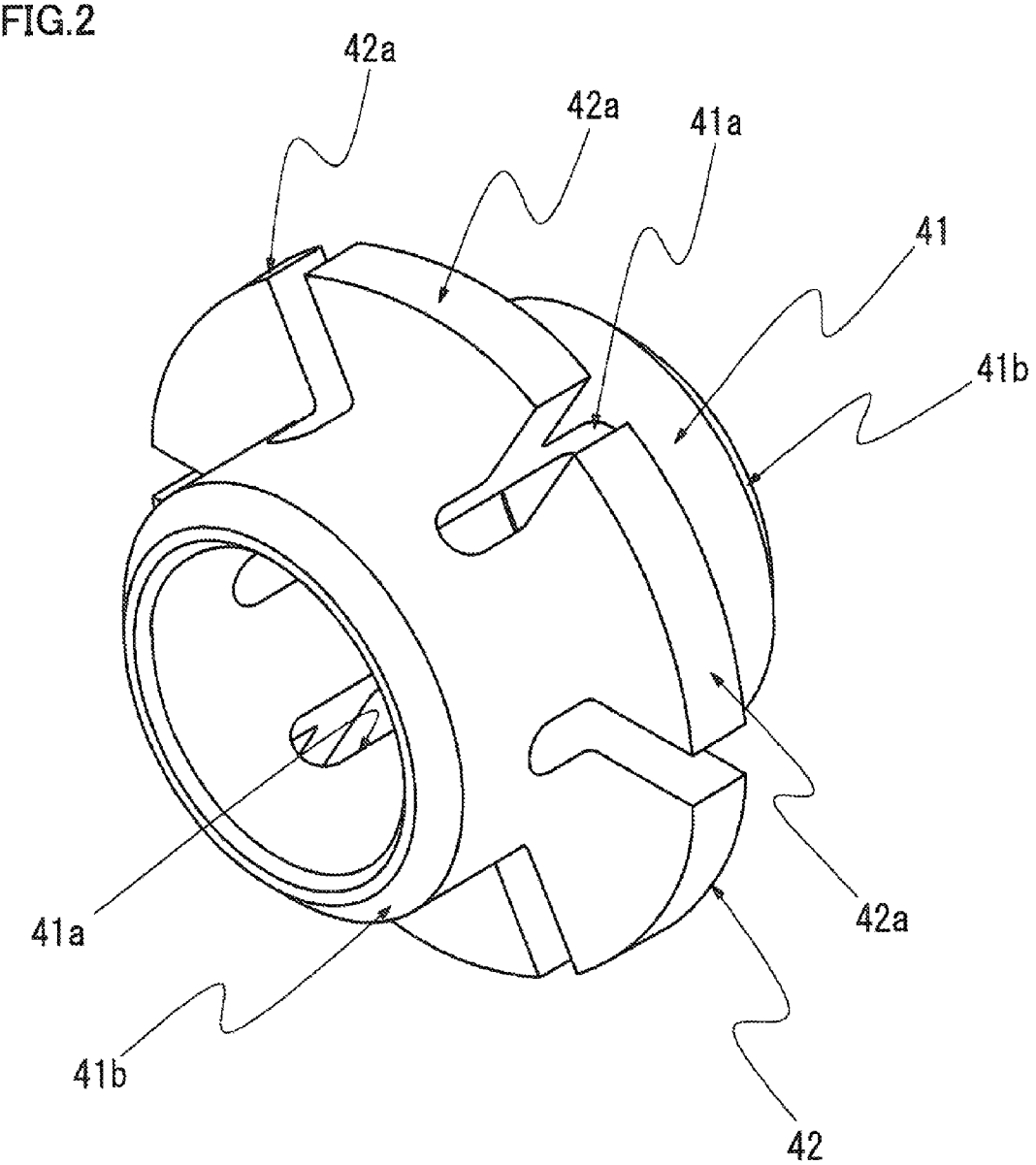
FIG. 2 is a perspective view of an example of a centrifugal spring in the bearing mechanism.
Figure 3A:
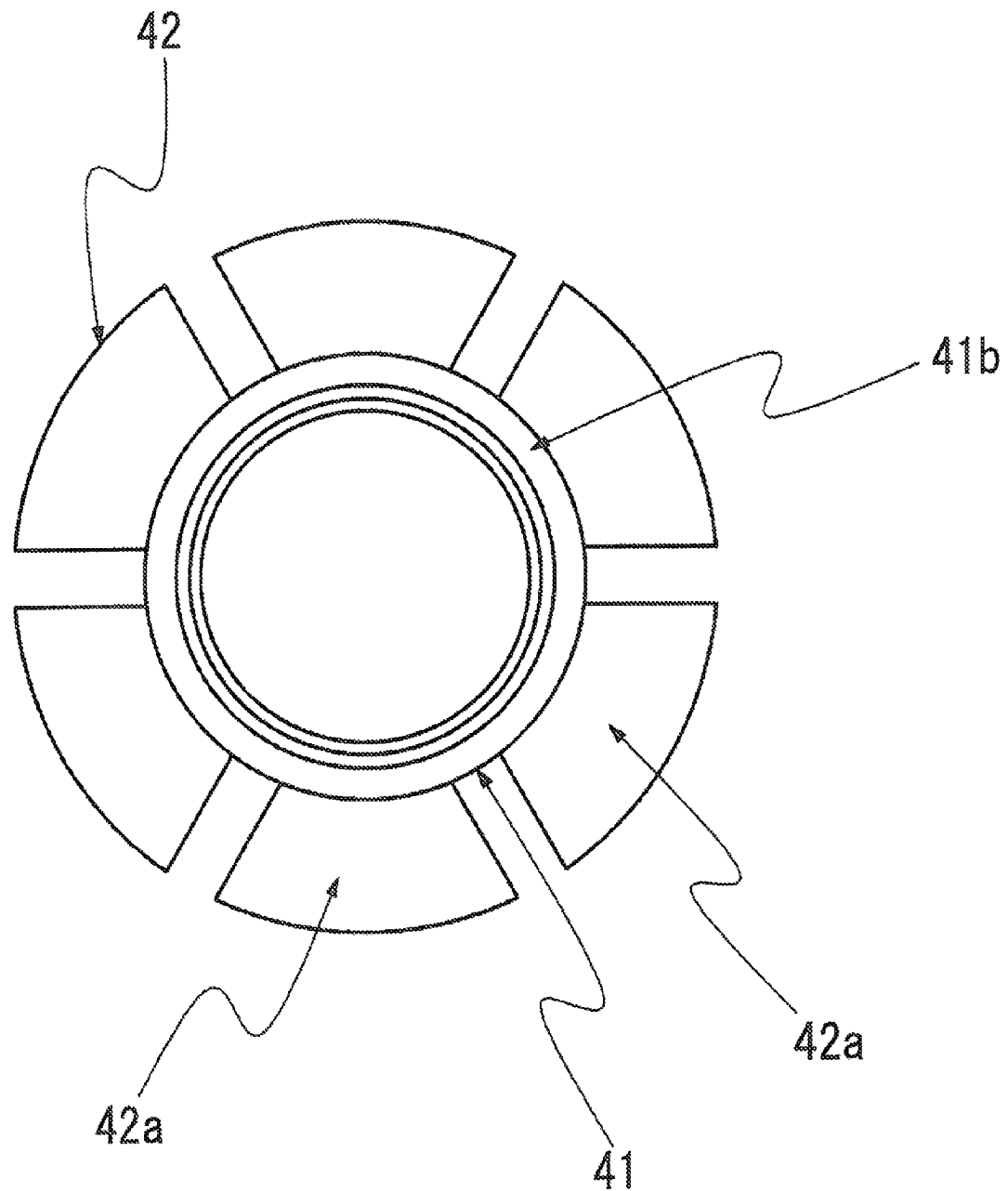
FIG. 3A is a front view of the centrifugal spring illustrated in FIG. 2.

A peripheral wall of the tube portion 41 is provided with a plurality of through-hole portions 41a that radially penetrate the peripheral wall (see FIGS. 2 and 3A). According to the illustrated examples, the plurality of through-hole portions 41a is extra-length long holes in the axial direction, and is provided at predetermined intervals in the circumferential direction. Each of the through-hole portions 41a is located in such a manner as to correspond to a space between divided projections 42a of the protruding portion 42, which are described later.

Figure 3B:
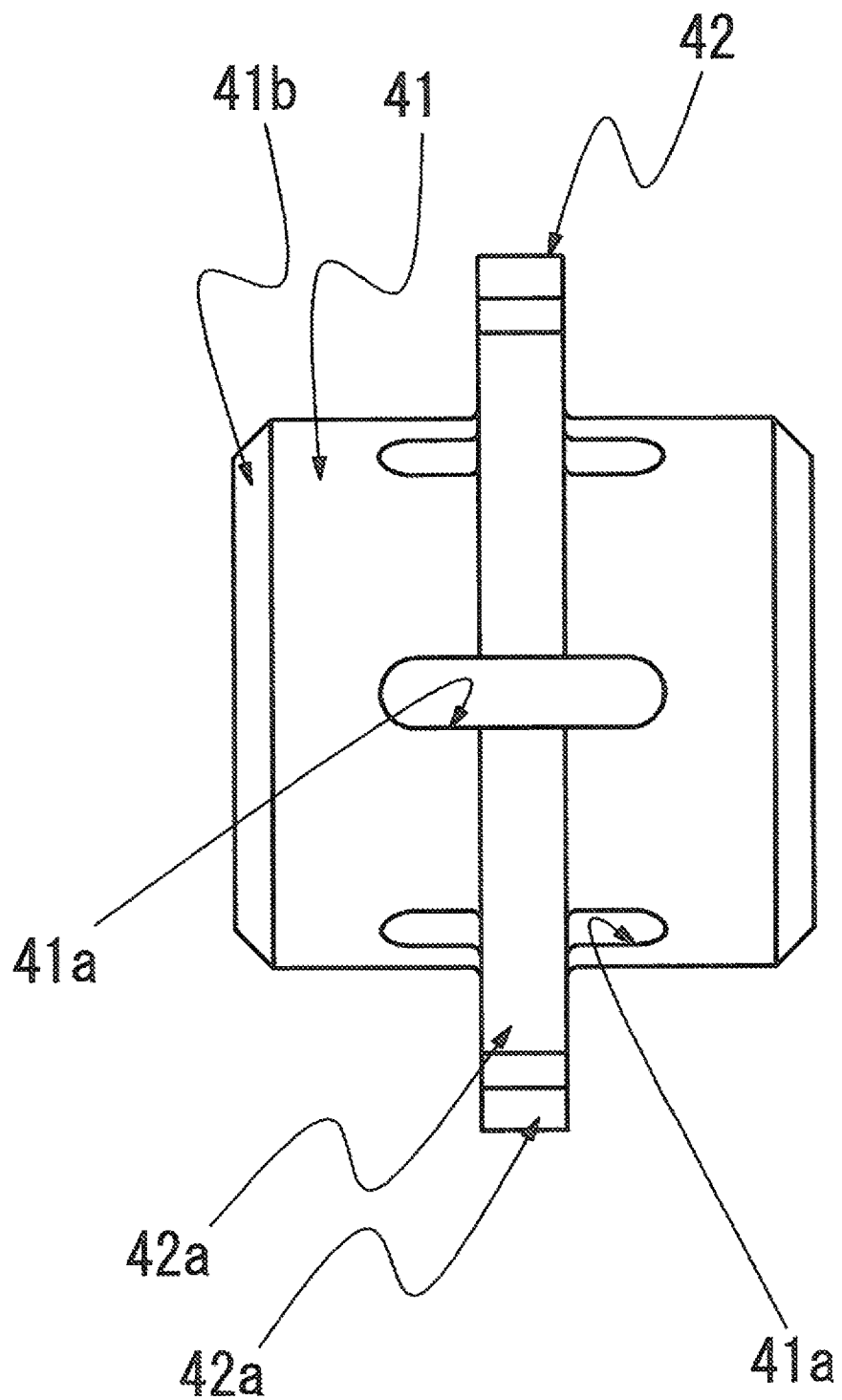
FIG. 3B is a side view of the centrifugal spring.

Moreover, chamfer portions 41b are formed all around the tube portion 41 on both end surfaces of the tube portion 41 in the axial direction. Consequently, the outer diameter side of the tube portion 41 is shorter than the inner diameter side in the axial direction. The chamfer portion 41b is formed in a sloping shape (C-chamfering) (see FIGS. 1 to 3) in the illustrated examples. In addition, the chamfer portion 41b may have, for example, a rounded shape (R-chamfering) or another shape in which the outer diameter side is gradually shortened.

In the illustrated examples, the protruding portion 42 is formed in a substantially ring shape of a plurality of (six in the illustrated examples) the divided projections 42a located in the substantially center part of the tube portion 41 in the axial direction (see FIGS. 2 and 3A). The plurality of divided projections 42a is arranged at predetermined intervals along the circumferential direction of the tube portion 41.

FIG. 3A illustrates a front view of the centrifugal spring. As illustrated in the drawing, each of the divided projections 42a is formed in such a manner as to have a substantially fan shape that gradually expands in the circumferential direction toward the radially outer side as viewed from the front.

Moreover, the thrust pad member 50 is formed of a metal material and the like to a tubular form. The thrust pad member 50 is placed in such a manner as to sandwich the tube portion 41 of the centrifugal spring 40 between the thrust pad member 50 and the inner ring 24 of the bearing 20a.

The thrust pad member 50 is fixed to the outer peripheral surface of the rotating shaft 30 in a state in which pressure is being applied to the tube portion 41 in the axial direction in such a manner as to generate preload on the bearing 20a via the tube portion 41 of the centrifugal spring 40. For example, press fitting, threaded engagement, or concave convex fitting can be used as means for fixing the thrust pad member 50 to the rotating shaft 30.

Next, the characteristic operation and effect of the bearing mechanism 1 with the above configuration are described in detail.

Firstly, if the rotation of the rotating shaft 30 is stopping, or if the rotating shaft 30 is rotating at a relatively low speed, the centrifugal force hardly acts on the centrifugal spring 40. In this state, the state in the manufacturing stage, in other words, the state where the thrust pad member 50 applies pressure to the tube portion 41 in the axial direction, and the tube portion 41 further applies pressure to the inner ring 24 of the bearing 20a in the axial direction, is maintained. With the applied pressure, the preload between the inner ring 24 and the outer ring 21 in the bearing 20a is generated and held.

For example, if the bearing mechanism 1 is used for a machine tool or the like, this state is suitable for the heavy-load processing with deep cuts at low rotational speeds.

Figure 4:
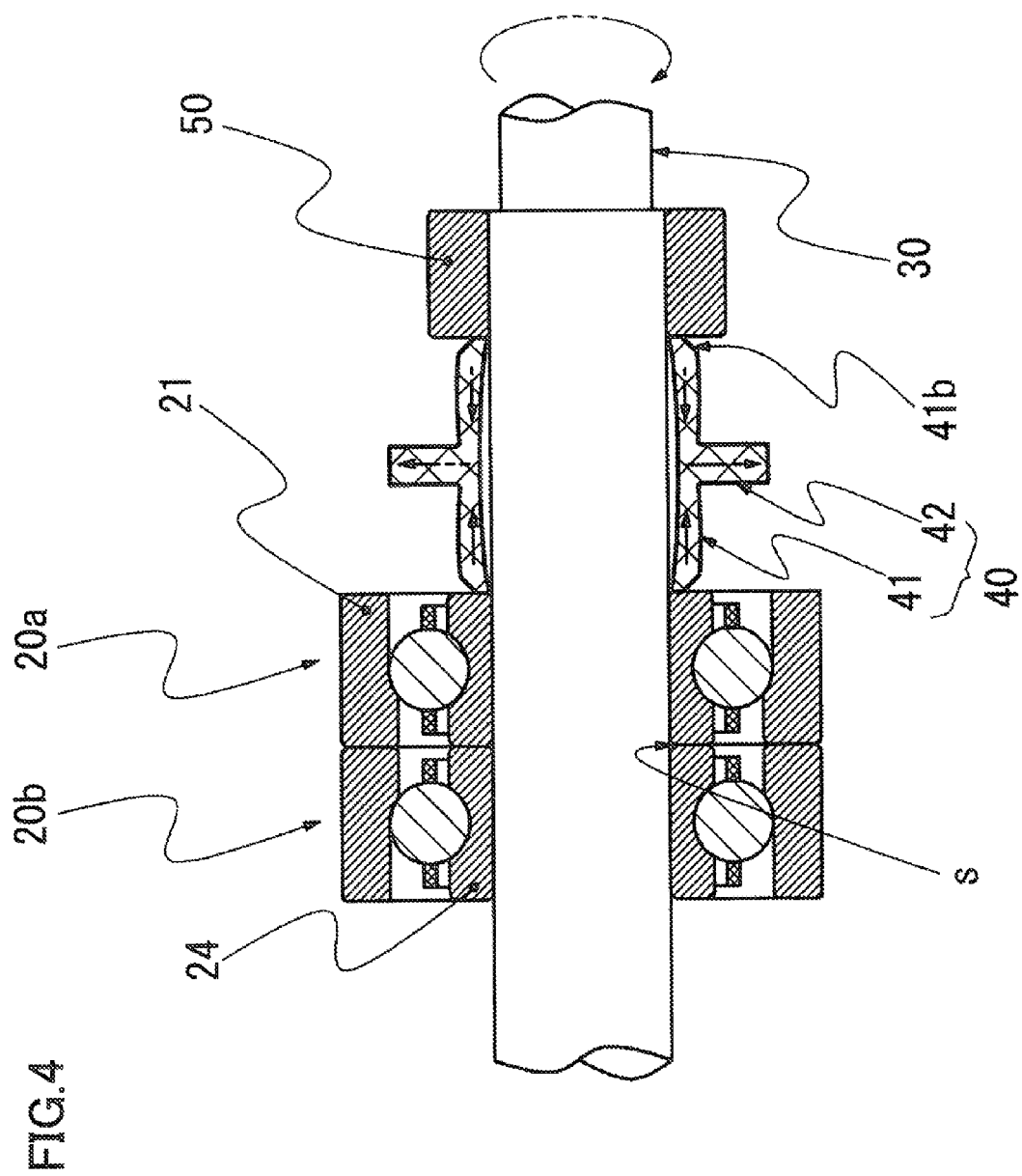
FIG. 4 is a cross-sectional view schematically illustrating the operation of the bearing mechanism according to the one embodiment of the present disclosure.

Moreover, when the rotating shaft 30 is rotating at a relatively high speed, the centrifugal force to act on the centrifugal spring 40 increases. The tube portion 41 of the centrifugal spring 40 then deforms elastically to a substantially barrel shape by being pulled toward the centrifugal direction (outward in the radial direction) by the protruding portion 42. More specifically, as illustrated in FIG. 4, the center side of the tube portion 41 in the axial direction is radially pulled outward by the centrifugal force of the protruding portion 42 rotating integrally with the rotating shaft 30. The tube portion 41 expands the diameter of the center side in the axial direction and deforms elastically to a substantially barrel shape. Furthermore, the overall length of the tube portion 41 in the axial direction contracts.

FIG. 4 illustrates a state where the centrifugal spring 40 has deformed to an extreme to explain the operation of the bearing mechanism 1 according to the embodiment in an understandable manner. FIG. 4 does not illustrate an actual degree of deformation of the centrifugal spring 40.

Upon the elastic deformation, the outer diameter side of the peripheral wall of the tube portion 41 attempts to stretch toward the axial direction relatively to the inner diameter side. However, the tube portion 41 includes the chamfer portions 41b on the end surfaces of the peripheral wall. Hence, the maximum dimension of the tube portion 41 in the axial direction does not increase, but contracts.

Therefore, the pressure in the axial direction applied to the inner ring 24 by the tube portion 41 weakens, and the preload between the inner ring 24 and the outer ring 21 in the bearing 20a reduces.

For example, if the bearing mechanism 1 is used for a machine tool or the like, this state is suitable for the low-load processing with shallow cuts at high rotational speeds. With this, reduction of the bearing life can be prevented or suppressed.

Hence, according to the bearing mechanism 1 with the above configuration, the preload to be applied to the bearing 20a can steplessly be increased or reduced according to the number of revolutions. Therefore, the preload to be applied to the bearing 20a can automatically be adjusted to appropriate pressure.

In addition, the bearing mechanism 1 does not need to include a hydraulic device, a piece and a disc spring on both sides of a bearing, and the like unlike the conventional technique, and accordingly can have a simple structure and is excellent in operating performance.

Furthermore, in the bearing mechanism 1, the material properties of the centrifugal spring 40, the thickness and mass of each portion of the centrifugal spring 40, and the like are adjusted appropriately and accordingly it is possible to easily adjust things such as the magnitude of the preload to be applied to the bearing 20a, and the rate of change of the preload in accordance with the number of revolutions.

In the bearing mechanism 1 with the above configuration, the centrifugal spring 40 can be replaced with one in another shape. A modification of the centrifugal spring is hereinafter described. The following centrifugal spring is one in which the configuration of the centrifugal spring 40 has partially been changed. Hence, the changed parts are mainly described in detail below, and the same reference numerals are used for the substantially same parts as those of the centrifugal spring 40 and the overlapping description is omitted.

Figure 7:
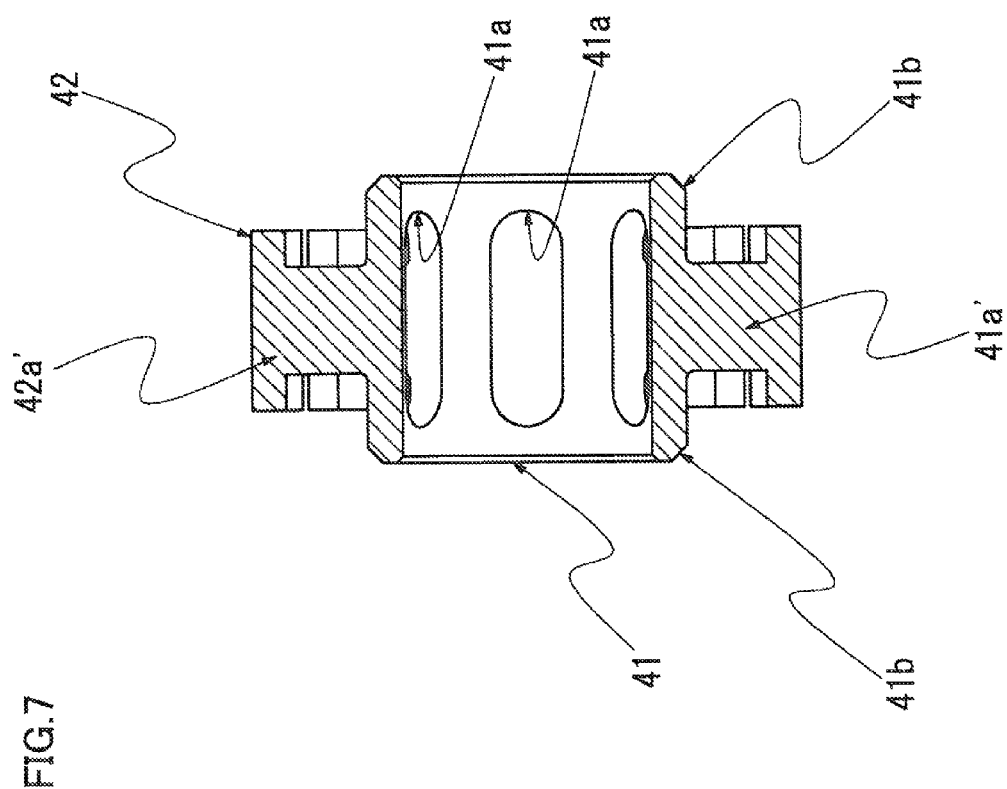
FIG. 7 is a cross-sectional view taken along line (VII)-(VII) of FIG. 6A.

A centrifugal spring 40' illustrated in FIGS. 5 to 7 has a configuration in which each divided projection 42a of the centrifugal spring 40 has been replaced with a divided projection 42a'.

The divided projection 42a' has a substantially constant axial thickness, and a circumferential dimension gradually increasing toward the radially outer side of the divided projection 42a'. Furthermore, in the vicinity of the maximum diameter of the divided projection 42a', the radial thickness of the divided projection 42' is maintained constant while the axial dimension of the divided projection 42' increases toward the opposite sides thereof.

Figure 9A:
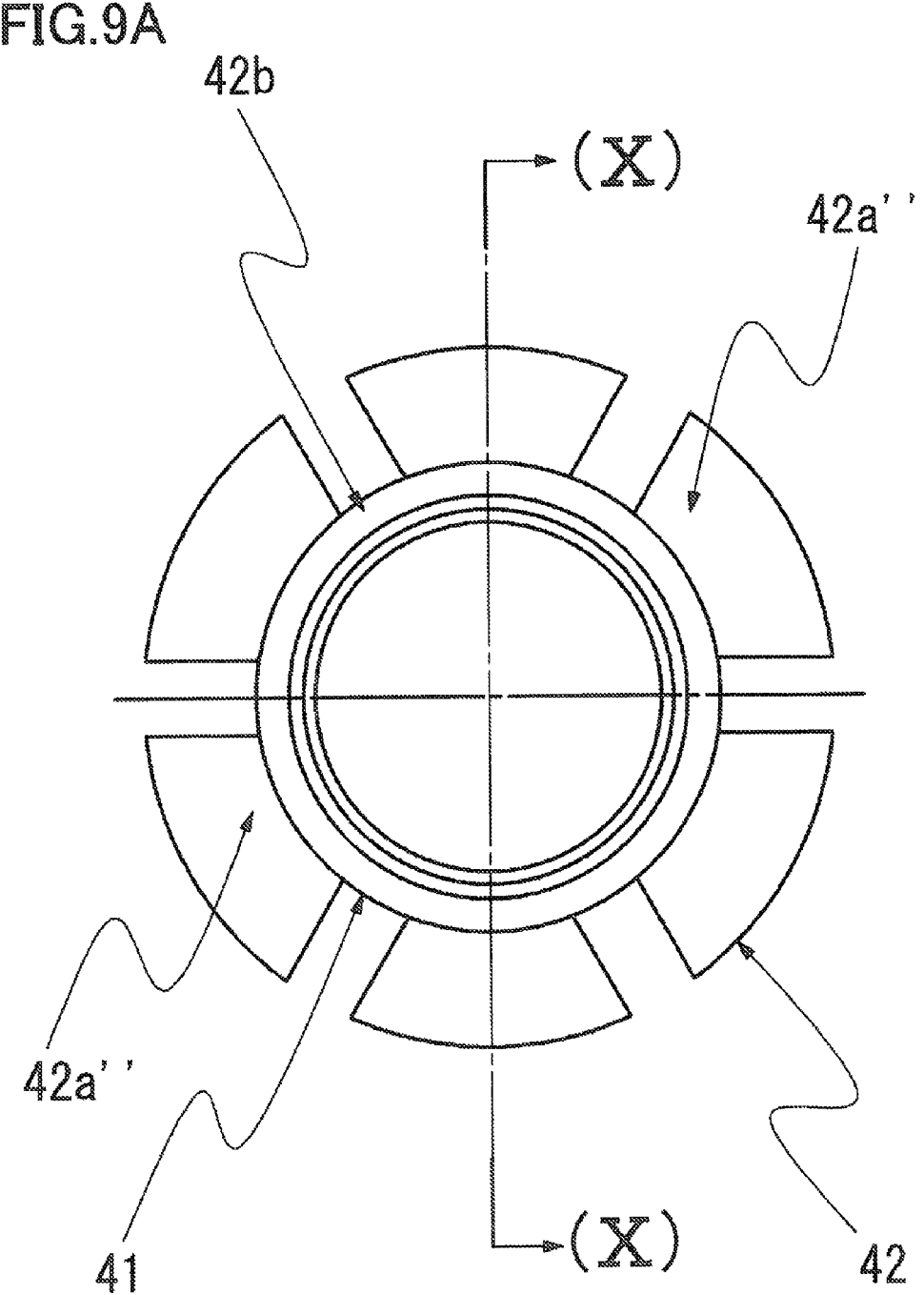
FIG. 9A is a front view of the centrifugal spring illustrated in FIG. 8.
Figure 9B:
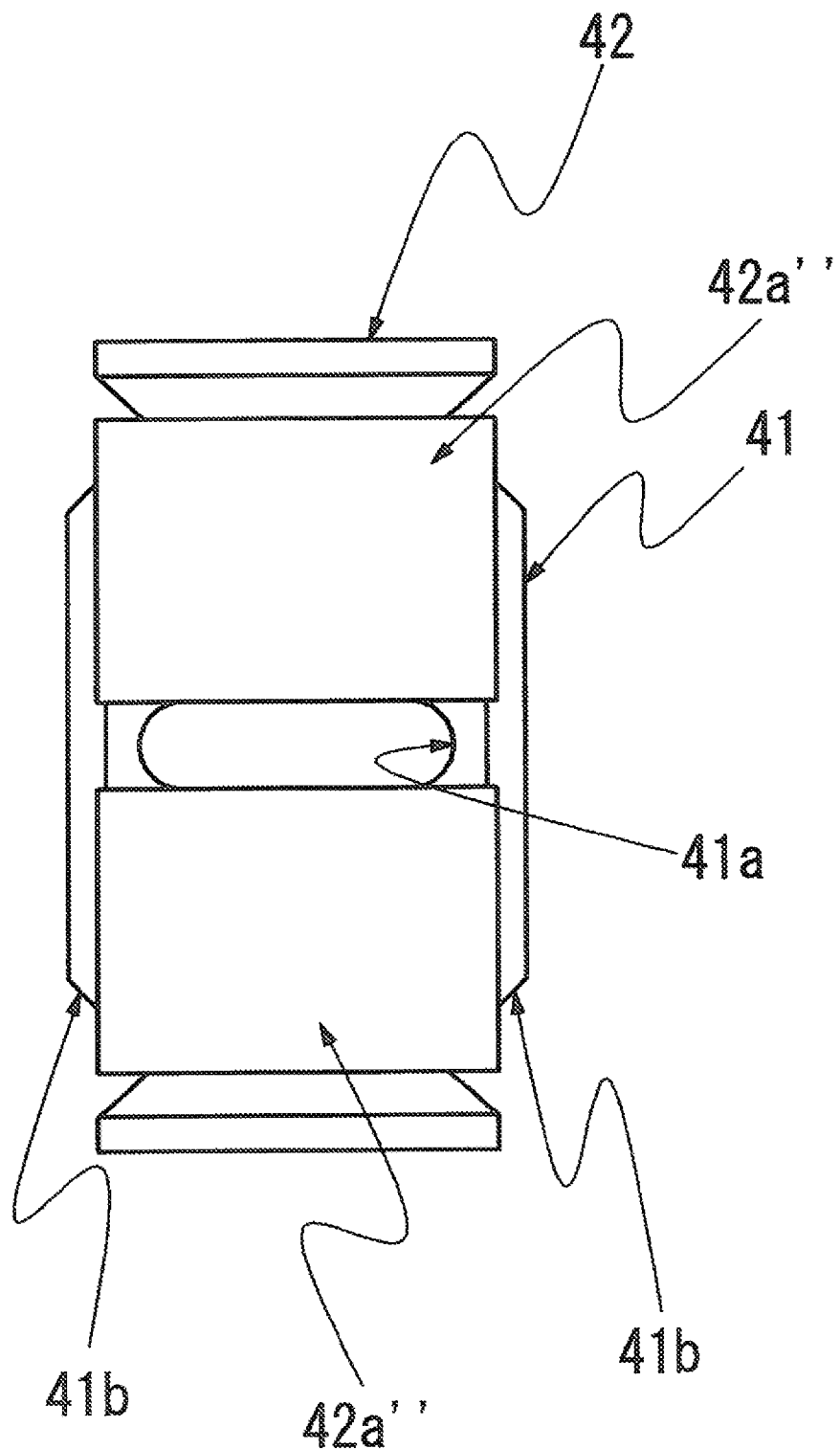
FIG. 9B is a side view of the centrifugal spring.
Figure 10:
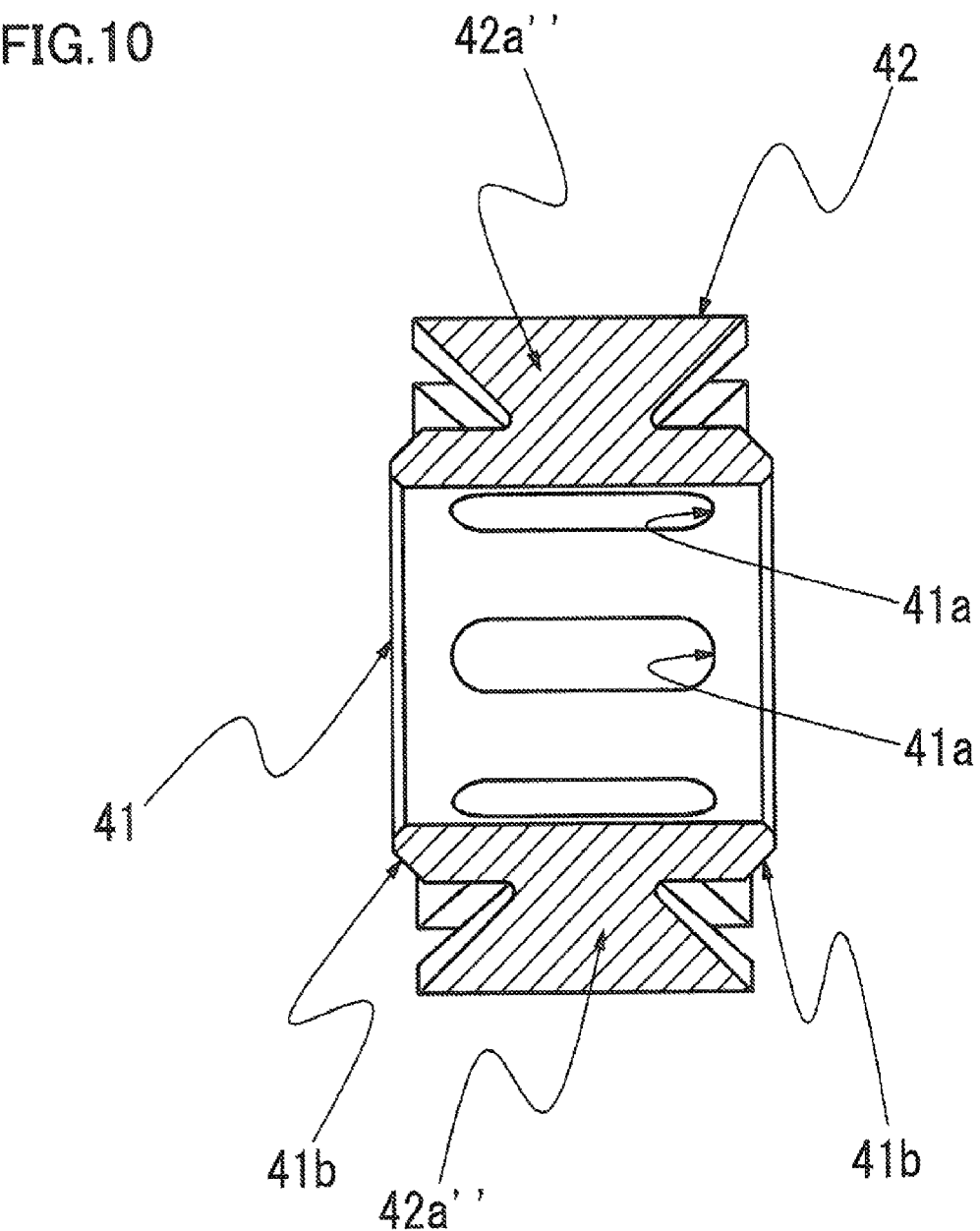
FIG. 10 is a cross-sectional view taken along line (X)-(X) of FIG. 9A.

Moreover, a centrifugal spring 40" illustrated in FIGS. 8 to 10 has a configuration in which each divided projection 42a of the centrifugal spring 40 has been replaced with a divided projection 42a".

The dimensions of the divided projection 42a" in the circumferential and axial directions gradually increase toward the radially outer side.

Hence, in the configuration in which the centrifugal spring 40 in the bearing mechanism 1 has been replaced with the centrifugal spring 40' or 40", the volume of the divided projection 42a' or 42a" toward the centrifugal direction is dramatically increased compared with the volume of the centrifugal spring 40 toward the centrifugal direction. Hence, the centrifugal force by the divided projection 42a' or 42a" increases. Accordingly, the amounts of deformation of the tube portion 41 in the radial and axial directions can also be increased. Therefore, the preload on the bearing 20a can more dramatically increase or reduce in response to the number of revolutions.

Figure 11:
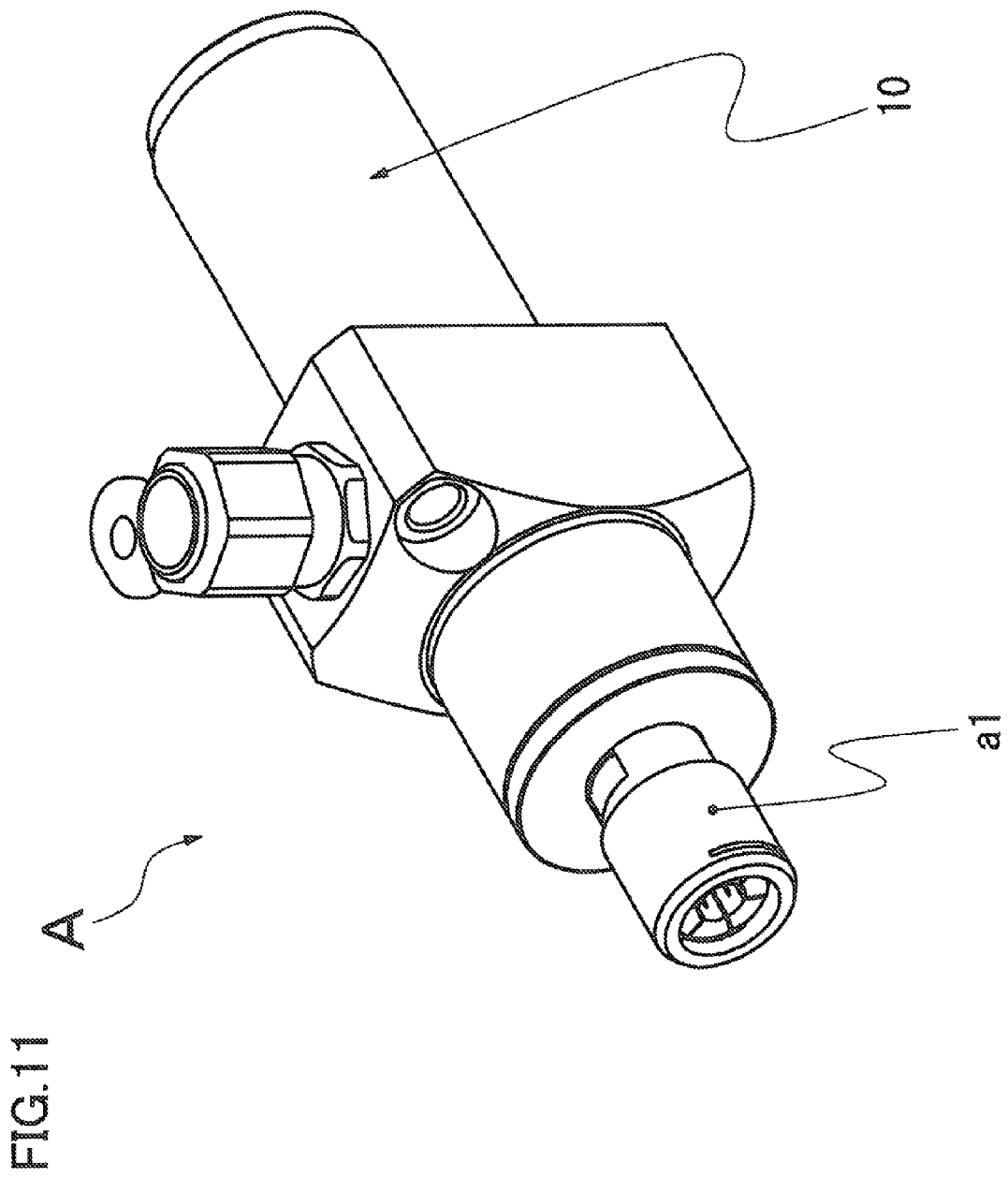
FIG. 11 is an exterior perspective view of an example of a spindle apparatus to which the bearing mechanism according to the one embodiment of the present disclosure has been applied.
Figure 12:
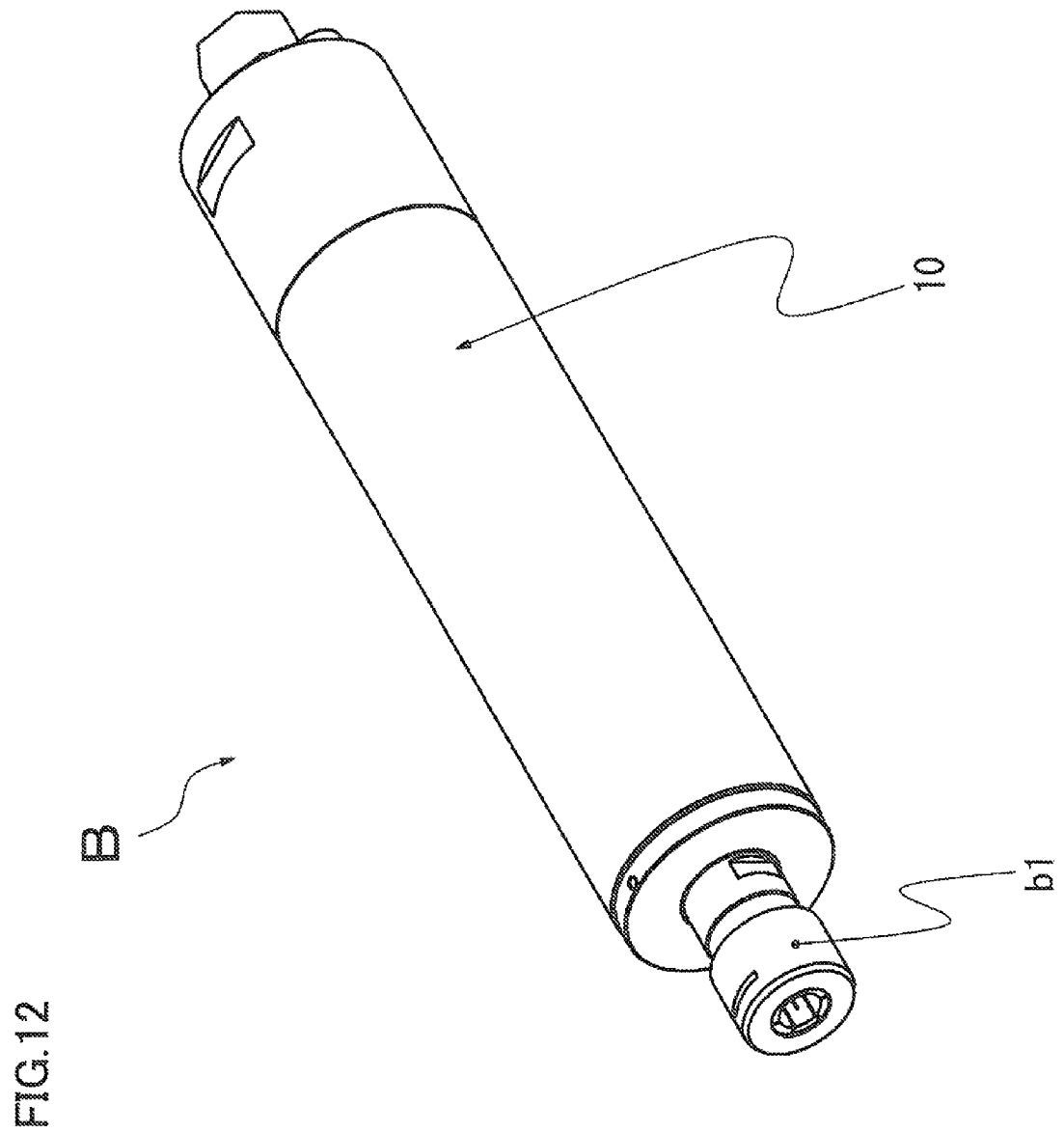
FIG. 12 is an exterior perspective view of another example of a spindle apparatus to which the bearing mechanism according to the one embodiment of the present disclosure has been applied.
Figure 13:
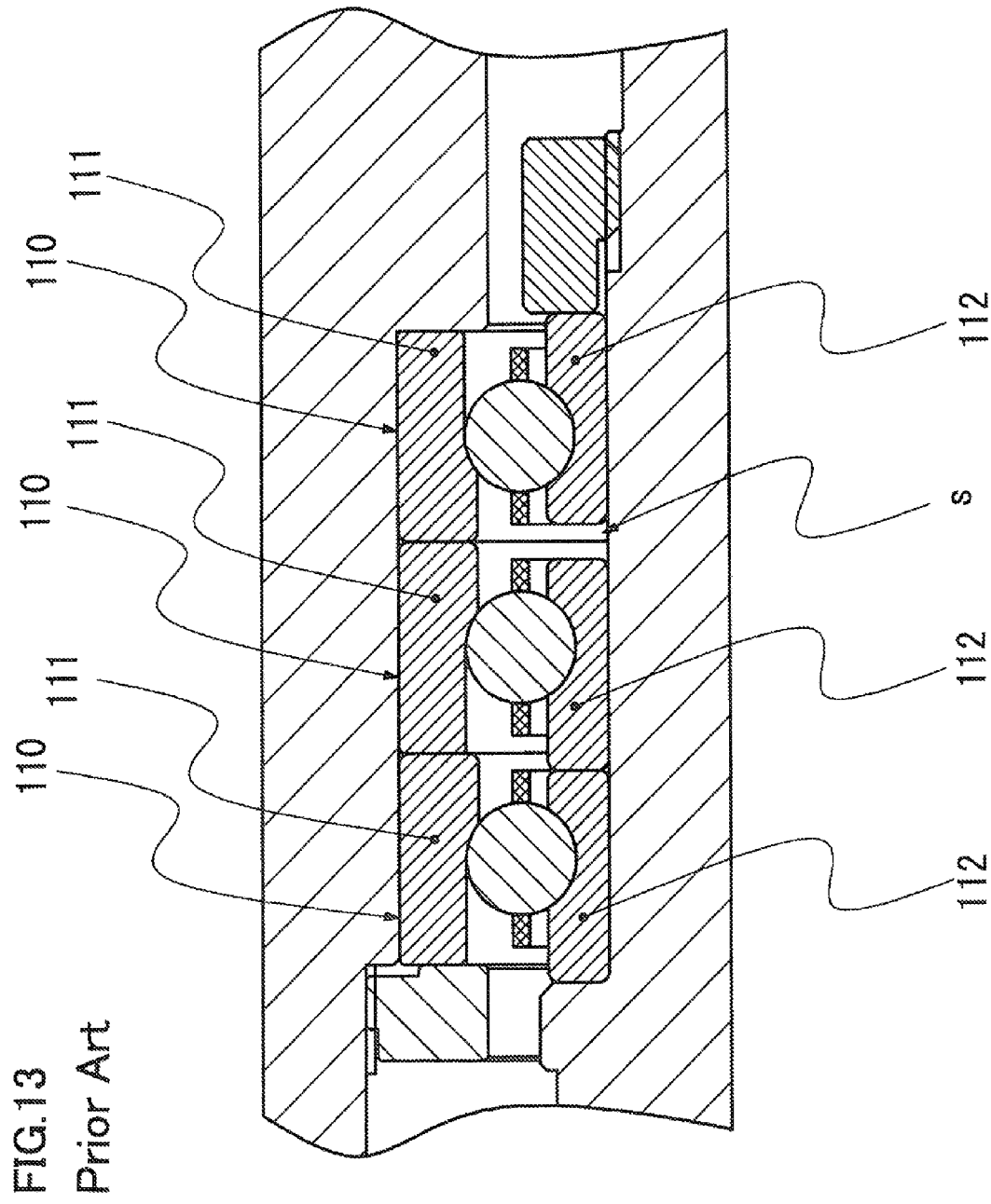
FIG. 13 is a cross-sectional view of an example of a known bearing mechanism to which the fixed position preload method has been applied.
Figure 14:
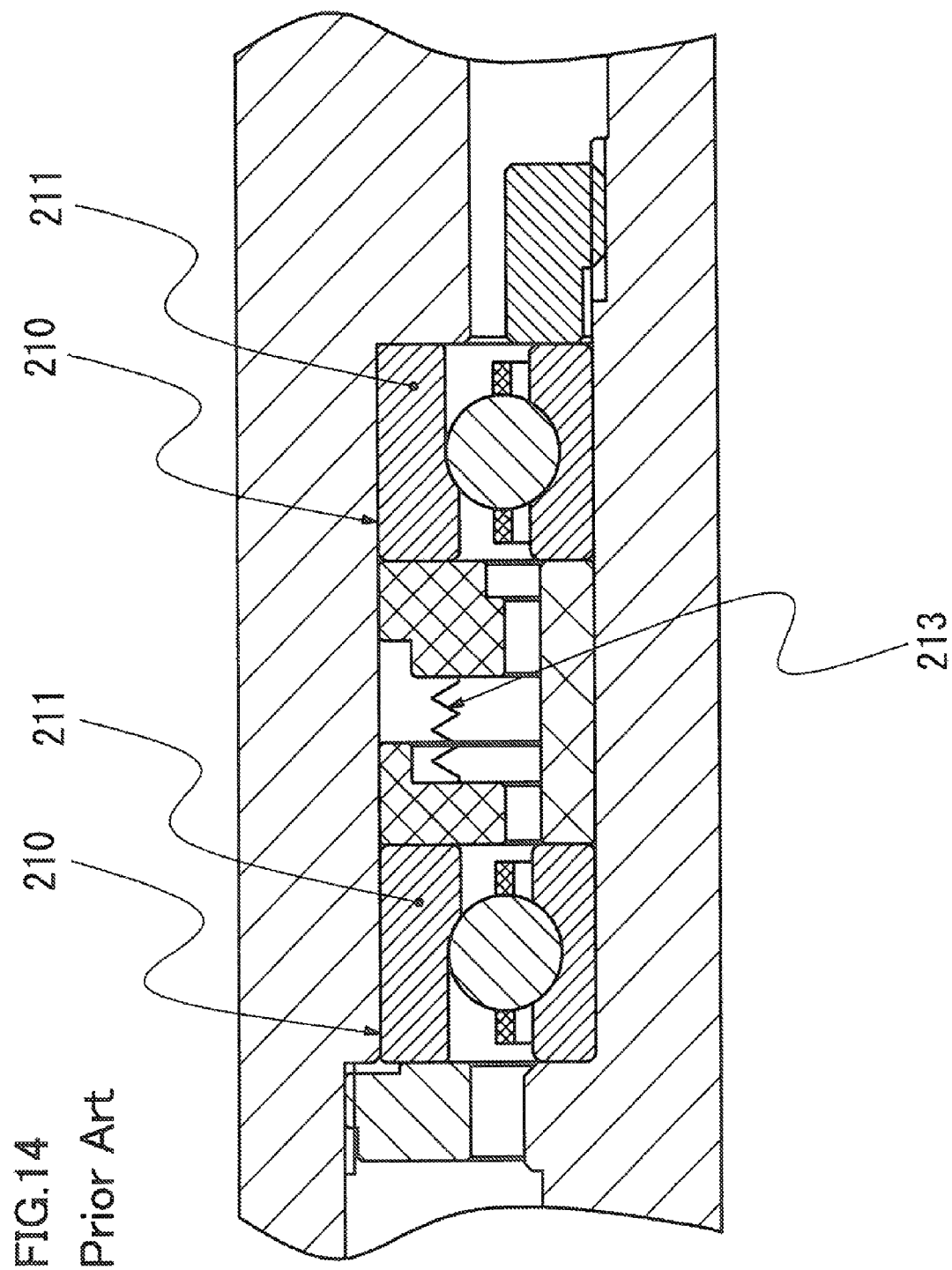
FIG. 14 is a cross-sectional view of an example of a known bearing mechanism to which the constant pressure preload method has been applied.

The bearing mechanism 1 with the above configuration can adopt spindle apparatuses A and B as illustrated in FIGS. 11 and 12.

The spindle apparatus A illustrated in FIG. 11 includes the bearing mechanism 1 with the above configuration in the substantially tubular housing 10. In the spindle apparatus A, a rotary drive unit a1 continuous to the rotating shaft 30 (see FIG. 1) is exposed to the outside.

The spindle apparatus B illustrated in FIG. 12 constructs a spindle apparatus having a larger diameter than the spindle apparatus A. The spindle apparatus B includes the bearing mechanism 1 with the above configuration in the substantially tubular housing 10. In the spindle apparatus B, a rotary drive unit b1 continuous to the rotating shaft 30 (see FIG. 1) is exposed to the outside.

In the above example, preload is applied to the bearing 20a by applying pressure to the inner ring 24 of the bearing 20a in the axial direction. However, as another example, preload may be applied to the bearing 20a by applying pressure to the outer ring 21 of the bearing 20a in the axial direction. In this case, specifically, out of the bearings 20a, 20b, and 20c illustrates in FIG. 1, only one bearing 20a or two bearings 20a and 20c are oriented opposite between left and right. The inner ring 24 of the bearing 20a is brought into contact with the inner ring 24 of the bearing 20b without a space while a space between the outer ring 21 of the bearing 20a and the outer ring 21 of the bearing 20b is defined.

Alternatively, the centrifugal spring 40 is placed between the bearings 20a and 20b and a sleeve in contact with the inner ring 24 of the bearing 20a and the inner ring 24 of the bearing 20b is provided between the inner rings 24.

Moreover, the bearings 20a, 20b, and 20c of the above example configure angular contact ball bearings. However, as another example, the bearings 20a, 20b, and 20c can be tapered roller bearings, deep-groove bearings, or the like.

Moreover, through-hole portions 41a provided in the tube portions 41 of the centrifugal springs 40, 40', and 40" are through type long holes in the illustrated examples. However, as another example, the through-hole portions 41a can also be a plurality of notches, slits, or the like that is formed in the peripheral wall of the tube portion 41.

Moreover, the centrifugal springs 40, 40', and 40" are not limited to those of the illustrated examples as long as they have the configuration in which the centrifugal force caused by the integral rotation with the rotating shaft 30 causes them to contract elastically in the axial direction while expanding the diameters elastically. The centrifugal springs 40, 40', and 40" can have, for example, a configuration in which a plurality of the protruding portions 42 arranged on the tube portion 41 in the axial direction is included, or a configuration in which the protruding portion 42 is omitted from the centrifugal spring 40 and only the tube portion 41 deforms elastically.

Moreover, according to the above example, one end of the centrifugal spring 40 in the axial direction is received by the thrust pad member 50 while the other end of the centrifugal spring 40 presses the inner rings 24. However, as another example, a configuration is one in which the one end of the centrifugal spring 40 is received by a pin-shaped member that is inserted into the rotating shaft 30. Alternatively, for example, another configuration is one in which the centrifugal spring 40 is fit in an engaging manner with the outer peripheral surface of the rotating shaft 30 to be positioned in the axial direction and press the inner rings 24.

Moreover, according to the above example, the tube portion 41 and protruding portion 42 of the centrifugal spring 40 are integrally formed of a hard synthetic resin material. However, as another example, another configuration is one in which the tube portion 41 and the protruding portion 42 are formed as separate bodies, and the protruding portion 42 is formed of a heavy weight material such as a metal material. In this configuration, it becomes easier for the centrifugal force to act.

The ring-shaped step portion 31 formed by reducing the diameter of the part on the bearings 20a, 20b, and 20c side may be formed on the outer peripheral portion of the rotating shaft 30. The end surface of the inner ring 24 of the bearing 20c may be in contact with the step portion 31.

Moreover, the chamfer portions 41b may be formed all around the tube portion 41 on both end surfaces of the tube portion 41 in the axial direction such that the outer diameter side is depressed in the axial direction more than the inner diameter side. The chamfer portion 41b may be formed in a sloping shape (C-chamfering) (see FIGS. 1 to 3), a rounded shape (R-chamfering), another shape in which the outer diameter side is gradually depressed, or the like.

The bearing mechanism of the present disclosure may be the following first to seventh bearing mechanisms.

The first bearing mechanism includes: an outer ring; an inner ring rotatably supported via a plurality of rolling elements on an inner peripheral side of the outer ring; and a rotating shaft supported on an inner peripheral side of the inner ring, in which one of the outer ring and the inner ring is supported in a manner immobile in the axial direction while pressure is applied to the other ring in the axial direction, and accordingly preload is generated between the outer and inner rings. The first bearing mechanism is configured such that an outer peripheral portion of the rotating shaft is provided with a centrifugal spring in such a manner as to be pressed against the other ring in the axial direction, and the centrifugal force upon integral rotation with the rotating shaft causes the centrifugal spring to contract elastically in the axial direction while expanding the diameter elastically.

In the second bearing mechanism according to the first bearing, the centrifugal spring is formed such that the volume of a radially outer portion is greater than the volume of a radially inner portion.

In the third bearing mechanism according to the first or second bearing mechanism, the centrifugal spring includes a tube portion attached to the rotating shaft in a ring form, and a protruding portion radially protruding outward from near the center of the tube portion in the axial direction, and the centrifugal force upon the integral rotation with the rotating shaft causes the tube portion to contract elastically in the axial direction while elastically expanding the diameter near the center of the tube portion in the axial direction.

In the fourth bearing mechanism according to the third bearing mechanism, the protruding portion is configured in a ring form of a plurality of divided projections arranged at intervals in the circumferential direction.

In the fifth bearing mechanism according to the fourth bearing mechanism, a peripheral wall of the tube portion is provided with a through-hole portion radially penetrating the peripheral wall, the through-hole portion corresponding to between the divided projections adjacent in the circumferential direction.

In the sixth bearing mechanism according to any of the third to fifth bearing mechanisms, the outer diameter side of an end surface of the tube portion is depressed in the axial direction more than the inner diameter side.

In the seventh bearing mechanism according to any of the first to sixth bearing mechanisms, a thrust pad member immobile in the axial direction is provided to the outer peripheral portion of the rotating shaft, and the centrifugal spring is sandwiched between the thrust pad member and the other ring.

The first to fourth bearing mechanisms are configured as described above. Therefore, there can be provided a bearing mechanism with a simple structure, capability of automatically adjusting the preload to be applied to a bearing to an appropriate level in response to the rotational speed of a rotating shaft, and excellent operating performance.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

The invention claimed is:

1. A bearing mechanism comprising:
   an outer ring;
   an inner ring rotatably supported by a plurality of rolling elements on an inner peripheral side of the outer ring, the outer ring being supported such that the outer ring is prevented from moving in an axial direction;
   a rotating shaft which is in contact with and supported by the inner ring on an inner peripheral side of the inner ring; and
   a centrifugal spring on an outer peripheral portion of the rotating shaft, the centrifugal spring having a tube portion being configured to press the inner ring along an outer peripheral surface of the rotating shaft in the axial direction to generate preload between the outer and inner rings by applying pressure to the inner ring in the axial direction, wherein
   the centrifugal spring is configured to elastically expand a diameter thereof and elastically contract in the axial direction by a centrifugal force caused by integral rotation with the rotating shaft, and
   the tube portion of the centrifugal spring is attached in a ring form to and pressed along the outer peripheral portion of the rotating shaft.

2. The bearing mechanism according to claim 1, wherein the centrifugal spring includes a radially outer portion and a radially inner portion which is the tube portion, and a volume of the radially outer portion is larger than a volume of the radially inner portion.

3. The bearing mechanism according to claim 1, further comprising a thrust pad member fixed to the outer peripheral portion of the rotating shaft, wherein the centrifugal spring is sandwiched between the thrust pad member and the inner ring.

4. A spindle apparatus comprising the bearing mechanism according to claim 1.

5. The bearing mechanism according to claim 1, further comprising:
   a housing which holds the outer ring;
   a supporting member which is connected to the housing and supports the outer ring to prevent the outer ring from moving in the axial direction.

6. A bearing mechanism, comprising:
   an outer ring;
   an inner ring rotatably supported by a plurality of rolling elements on an inner peripheral side of the outer ring, the outer ring being supported such that the outer ring is prevented from moving in an axial direction;
   a rotating shaft which is in contact with and supported by the inner ring on an inner peripheral side of the inner ring; and
   a centrifugal spring on an outer peripheral portion of the rotating shaft, the centrifugal spring having a tube portion being configured to press the inner ring along an outer peripheral surface of the rotating shaft in the axial direction to generate preload between the outer and inner rings by applying pressure to the inner ring in the axial direction, wherein
   the centrifugal spring is configured to elastically expand a diameter thereof and elastically contract in the axial direction by a centrifugal force caused by integral rotation with the rotating shaft,
   the centrifugal spring includes the tube portion attached to the rotating shaft in a ring form, and a protruding portion radially protruding outward from near the center of the tube portion in the axial direction, and
   the centrifugal force caused by the integral rotation of the centrifugal spring with the rotating shaft causes the tube portion to contract elastically in the axial direction while elastically expanding the diameter of a part of the tube portion near the center in the axial direction.

7. The bearing mechanism according to claim 6, wherein the protruding portion includes a plurality of divided projections arranged at intervals in a ring form in the circumferential direction.

8. The bearing mechanism according to claim 7, wherein the outer diameter of an end surface of the tube portion is tapered.

9. The bearing mechanism according to claim 7, wherein a peripheral wall of the tube portion is provided with a through-hole portion radially penetrating the peripheral wall in such a manner as to correspond to a space between the divided projections adjacent in the circumferential direction.

10. The bearing mechanism according to claim 9, wherein the outer diameter of an end surface of the tube portion is tapered.

11. The bearing mechanism according to claim 6, wherein the outer diameter of an end surface of the tube portion is tapered.

12. The bearing mechanism according to claim 6,
    wherein the protruding portion includes a plurality of divided projections each of which is formed in a such a manner as to increase a circumferential dimension toward a radially outer side of the respective divided projection.

13. The bearing mechanism according to claim 6,
    wherein the protruding portion includes a plurality of divided projections each of which has a circumferential dimension increasing toward a radially outer side of the divided projection, and
    in the vicinity of a maximum diameter of each of the divided projections, a radial thickness of the divided projection is maintained constant and an axial dimension of the divided projection increases toward opposite sides of the divided projection in the axial direction.

14. A bearing mechanism, comprising:
    an outer ring;
    an inner ring rotatably supported by a plurality of rolling elements on an inner peripheral side of the outer ring, the outer ring being supported such that the outer ring is prevented from moving in an axial direction;
    a rotating shaft which is in contact with and supported by the inner ring on an inner peripheral side of the inner ring; and
    a centrifugal spring on an outer peripheral portion of the rotating shaft, the centrifugal spring having a tube portion being configured to press the inner ring along an outer peripheral surface of the rotating shaft in the axial direction to generate preload between the outer and inner rings by applying pressure to the inner ring in the axial direction, wherein the centrifugal spring is configured to elastically expand a diameter thereof and elastically contract in the axial direction by a centrifugal force caused by integral rotation with the rotating shaft, the centrifugal spring includes a radially outer portion and a radially inner portion which is the tube portion, a volume of the radially outer portion is larger than a volume of the radially inner portion, the centrifugal spring includes the tube portion attached to the rotating shaft in a ring form, and a protruding portion as the radially outer portion which is radially protruding outward from near the center of the tube portion in the axial direction, and the centrifugal force caused by the integral rotation of the centrifugal spring with the rotating shaft causes the tube portion to contract elastically in the axial direction while elastically expanding the diameter of a part of the tube portion near the center in the axial direction.

15. The bearing mechanism according to claim 14, wherein the protruding portion includes a plurality of divided projections arranged at intervals in a ring form in the circumferential direction.

16. The bearing mechanism according to claim 15, wherein the outer diameter of an end surface of the tube portion is tapered.

17. The bearing mechanism according to claim 15, wherein a peripheral wall of the tube portion is provided with a through-hole portion radially penetrating the peripheral wall in such a manner as to correspond to a space between the divided projections adjacent in the circumferential direction.

18. The bearing mechanism according to claim 17, wherein the outer diameter of an end surface of the tube portion is tapered.

19. The bearing mechanism according to claim 14, wherein the outer diameter of an end surface of the tube portion is tapered.

* * * * *